United States Patent
Zhang et al.

(10) Patent No.: US 8,742,683 B2
(45) Date of Patent: Jun. 3, 2014

(54) LED BACKLIGHT DRIVING CIRCUIT AND LED BACKLIGHT DRIVING METHOD

(71) Applicant: Shenzhen China Star Optoelectronics Technology Co., Ltd., Shenzhen (CN)

(72) Inventors: Xianming Zhang, Shenzhen (CN); Xiang Yang, Shenzhen (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 0 days.

(21) Appl. No.: 13/699,728

(22) PCT Filed: Sep. 21, 2012

(86) PCT No.: PCT/CN2012/081709
§ 371 (c)(1),
(2), (4) Date: Nov. 24, 2012

(87) PCT Pub. No.: WO2014/040307
PCT Pub. Date: Mar. 20, 2014

(65) Prior Publication Data
US 2014/0070723 A1 Mar. 13, 2014

(30) Foreign Application Priority Data
Sep. 11, 2012 (CN) .......................... 2012 1 0334433

(51) Int. Cl.
*G05F 1/00* (2006.01)
*H05B 37/02* (2006.01)
*H05B 39/04* (2006.01)
*H05B 41/36* (2006.01)
*H05B 33/08* (2006.01)

(52) U.S. Cl.
CPC ........ *H05B 33/0806* (2013.01); *H05B 33/0824* (2013.01); *H05B 33/0833* (2013.01)

USPC .......... 315/291; 315/186; 315/193; 315/302; 315/307

(58) Field of Classification Search
None
See application file for complete search history.

(56) References Cited

U.S. PATENT DOCUMENTS

2011/0037399 A1    2/2011   Hung et al.
2013/0300770 A1*  11/2013   Yang et al. ............ 345/690

FOREIGN PATENT DOCUMENTS

| CN | 201563261 U | 8/2010 |
| CN | 101848577 A | 9/2010 |
| CN | 102629451 A | 8/2012 |
| CN | 202394501 U | 8/2012 |
| WO | 2011/053760 A1 | 5/2011 |

* cited by examiner

Primary Examiner — Anh Tran
(74) Attorney, Agent, or Firm — Cheng-Ju Chiang

(57) ABSTRACT

The present invention provides an LED backlight driving circuit and an LED backlight driving method. The circuit includes an isolation MOS transistor, a dimming MOS transistor connected in parallel to the isolation MOS transistor, and first and second resistors. The first resistor and the second resistor are connected to each other in parallel and are connected between the dimming MOS transistor and a ground wire. The isolation MOS transistor and the dimming MOS transistor are arranged for electrical connection with an LED light. The LED backlight driving circuit arranges the isolation MOS transistor and the dimming MOS transistor to connect in parallel to each other so as to make the electrical current flowing through the isolation MOS transistor lessened to reduce the amount of heat emitting therefrom and enhance operation safety and also allow the MOS transistor used to be of a downgraded specification to lower down the manufacture cost.

11 Claims, 3 Drawing Sheets

11 — providing an isolation MOS transistor, a dimming MOS transistor, a first resistor, a second resistor, and a signal amplification module 12 — connecting the isolation MOS transistor and the dimming MOS transistor to each other in parallel and electrically connecting the dimming MOS transistor via the first and second resistors to a ground wire, wherein a common node of the isolation MOS transistor and the dimming MOS transistor is connected to an LED light 13 — connecting the isolation MOS transistor to the signal amplification module 14 — providing a constant current source and electrically connecting the constant current source to the dimming MOS transistor

Fig. 3

LED BACKLIGHT DRIVING CIRCUIT AND LED BACKLIGHT DRIVING METHOD

BACKGROUND OF THE INVENTION

1. Field of the Invention

The present invention relates to the field of liquid crystal displaying, and in particular to an LED backlight driving circuit and LED backlight driving method.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module arranges a light source, such as a cold cathode fluorescent lamp (CCFL) or a light-emitting diode (LED), at the back side of the liquid crystal panel to form a planar light source that directly provides lighting to the liquid crystal panel. The side-edge backlight module arranges an LED light bar of a backlight source at an edge of a backplane that is located rearward of one side of the liquid crystal panel. The LED light bar emits light that enters a light guide plate (LGP) through a light incident face of the light guide plate and is projected out through a light emergence face of the light guide plate, after being reflected and diffused, to thereby transmit through an optic film assembly to form a planar light source for the liquid crystal panel.

Referring to FIG. 1, a conventional method for driving LED light bar of back light source adopts an arrangement of serially connecting a dimming MOS transistor Q10 with an isolation MOS transistor Q20. This leads to an extremely high current I flowing through the isolation MOS transistor thereby inducing a large amount of heat, an excessively high temperature, and lowered circuit safety. To solve such a problem, a conventional solution uses an over-specification isolation MOS transistor (such as having better resistance against high temperature). This definitely increases the cost to some extents.

SUMMARY OF THE INVENTION

An object of the present invention is to provide an LED backlight driving circuit, which lessens the current flowing through an isolation MOS transistor so as to reduce the amount of heat emitting therefrom, enhance operation safety, and also allow the MOS transistor used to be of a downgraded specification to lower down manufacture cost.

Another object of the present invention is to provide an LED backlight driving method, which lessens the electrical current flowing through an isolation MOS transistor so as to reduce the amount of heat emitting therefrom, enhance operation safety, and also allow the MOS transistor used to be of a downgraded specification to lower down manufacture cost.

To achieve the above object, the present invention provides an LED backlight driving circuit, which comprises an isolation MOS transistor, a dimming MOS transistor connected in parallel to the isolation MOS transistor, a first resistor, and a second resistor. The first resistor and the second resistor are connected to each other in parallel and are connected between the dimming MOS transistor and a ground wire. The isolation MOS transistor and the dimming MOS transistor are arranged for electrical connection with an LED light.

The isolation MOS transistor comprises a first source terminal, a first drain terminal, and a first gate terminal and the dimming MOS transistor comprises a second source terminal, a second drain terminal, and a second gate terminal. The first source terminal is connected to the second source terminal for connection with the LED light. The first gate terminal is electrically connected to a power output terminal of the LED backlight driving circuit. The second gate terminal is electrically connected to the dimming module. The second drain terminal is connected to an end of the first and second resistors.

The first and second resistors have an opposite end that is electrically connected to the ground wire.

The LED backlight driving circuit further comprises a signal amplification module electrically connected to the first drain terminal of the isolation MOS transistor.

The signal amplification module is a signal amplifier, which comprises a first pin, a second pin, a third pin, a fourth pin, and a fifth pin. The first pin is electrically connected to the first drain terminal of the isolation MOS transistor.

The LED backlight driving circuit further comprises a constant current source. The constant current source is electrically connected to the second drain terminal.

The present invention also provides an LED backlight driving circuit, which comprises an isolation MOS transistor, a dimming MOS transistor connected in parallel to the isolation MOS transistor, a first resistor, and a second resistor, the first resistor and the second resistor being connected to each other in parallel and being connected between the dimming MOS transistor and a ground wire, the isolation MOS transistor and the dimming MOS transistor being arranged for electrical connection with an LED light;

wherein the isolation MOS transistor comprises a first source terminal, a first drain terminal, and a first gate terminal and the dimming MOS transistor comprises a second source terminal, a second drain terminal, and a second gate terminal, the first source terminal being connected to the second source terminal for connection with the LED light, the first gate terminal being electrically connected to a power output terminal of the LED backlight driving circuit, the second gate terminal being electrically connected to the dimming module, the second drain terminal being connected to an end of the first and second resistors;

wherein the first and second resistors have an opposite end that is electrically connected to the ground wire;

further comprising a signal amplification module electrically connected to the first drain terminal of the isolation MOS transistor;

wherein the signal amplification module is a signal amplifier, which comprises a first pin, a second pin, a third pin, a fourth pin, and a fifth pin, the first pin being electrically connected to the first drain terminal of the isolation MOS transistor; and further comprising a constant current source, the constant current source being electrically connected to the second drain terminal.

The present invention also provides an LED backlight driving method, which comprises the following steps:

Step 1: providing an isolation MOS transistor, a dimming MOS transistor, a first resistor, a second resistor, and a signal amplification module;

Step 2: connecting the isolation MOS transistor and the dimming MOS transistor to each other in parallel and electrically connecting the dimming MOS transistor via the first and second resistors to a ground wire, wherein a common node of the isolation MOS transistor and the dimming MOS transistor is connected to an LED light; and Step 3: connecting the isolation MOS transistor to the signal amplification module.

The isolation MOS transistor comprises a first source terminal, a first drain terminal, and a first gate terminal and the dimming MOS transistor comprises a second source terminal, a second drain terminal, and a second gate terminal. The first source terminal is connected to the second source terminal for connection with the LED light. The first gate terminal is electrically connected to a power output terminal of the LED backlight driving circuit. The second gate terminal is electrically connected to the dimming module. The second drain terminal is connected to an end of the first and second resistors. The first and second resistors having an opposite end that is electrically connected to the ground wire.

The LED backlight driving method further comprises Step 4 of providing a constant current source and electrically connecting the constant current source to the dimming MOS transistor.

The signal amplification module is a signal amplifier, which comprises a first pin, a second pin, a third pin, a fourth pin, and a fifth pin, and Step 3 electrically connecting the first pin of the signal amplifier to the first drain terminal of the isolation MOS transistor.

The efficacy of the present invention is that the present invention provides an LED backlight driving circuit, which comprises an isolation MOS transistor and a dimming MOS transistor connected to each other in parallel so as to make the electrical current flowing through the isolation MOS transistor lessened to reduce the amount of heat emitting therefrom and enhance operation safety and also allow the MOS transistor used to be of a downgraded specification to lower down the manufacture cost. The present invention also provides an LED backlight driving method, which lessens the electrical current of the isolation MOS transistor so as to reduce the amount of heat emitting therefrom, enhance operation safety, allow the MOS transistor used to be of a downgraded specification, and thus lower down manufacture cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings:

FIG. 3 is a flow chart illustrating an LED backlight driving method according to the present invention.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
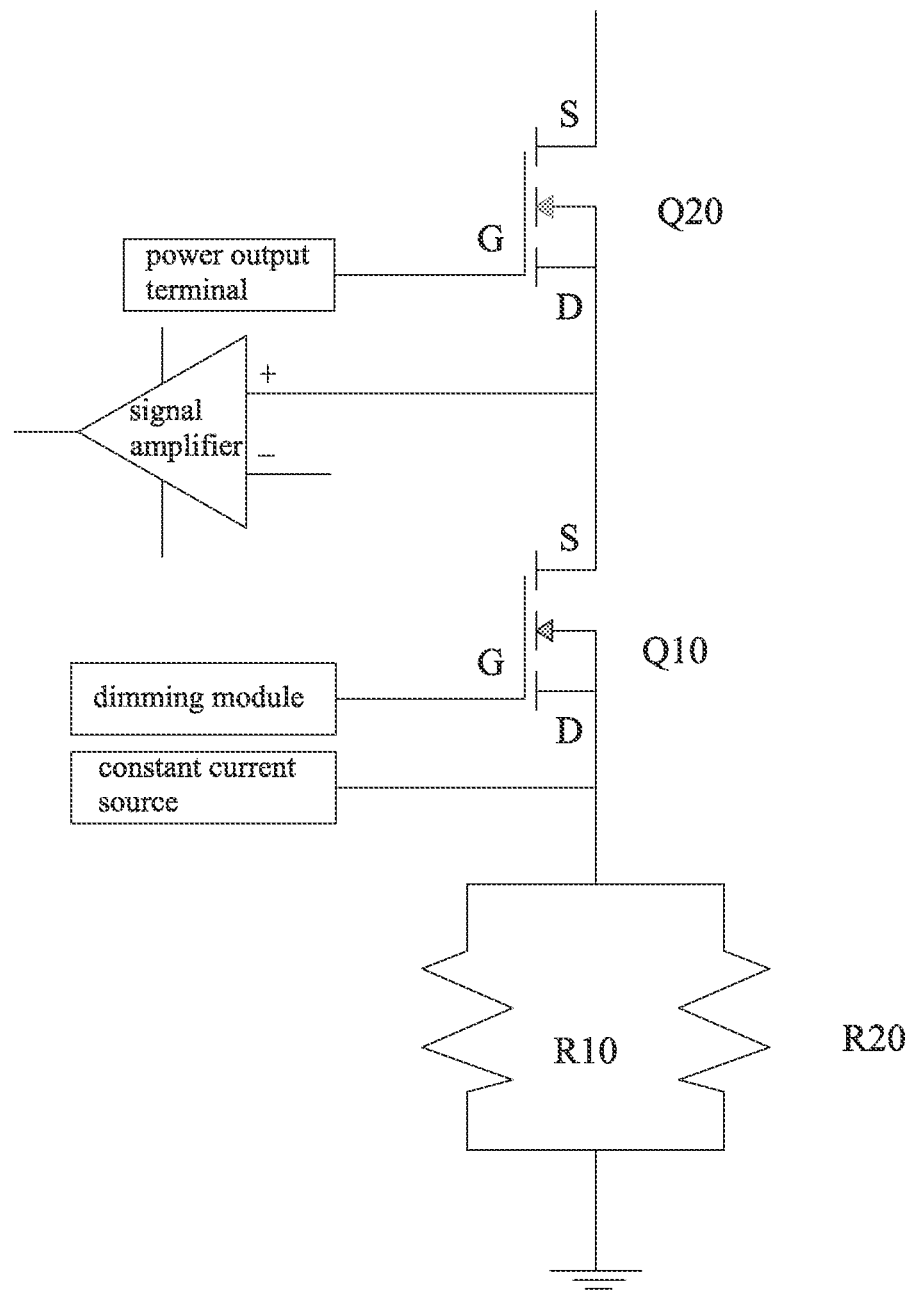
FIG. 1 is a schematic view showing a conventional LED backlight driving circuit.
Figure 2:
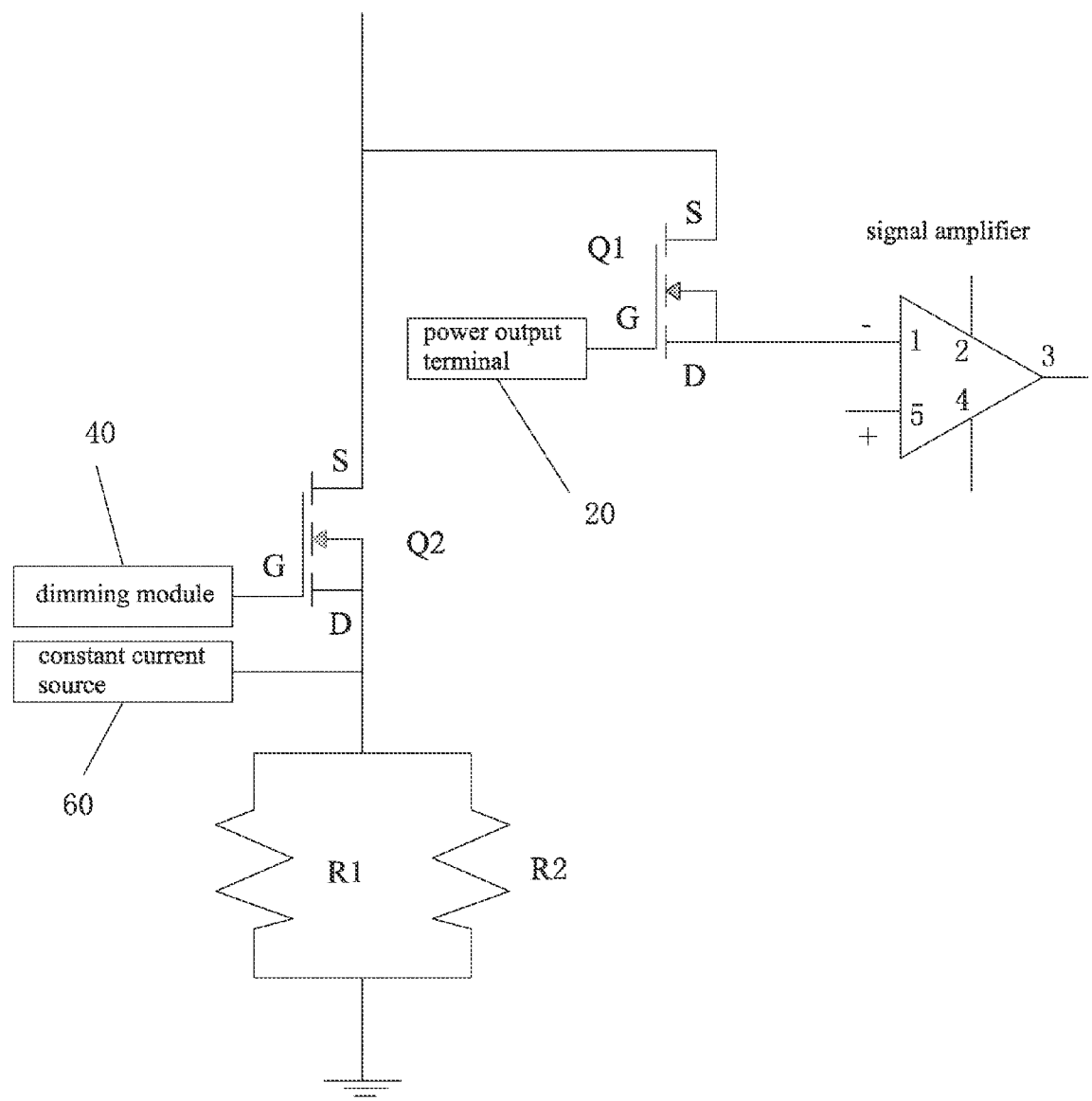
FIG. 2 is a schematic view showing an LED backlight driving circuit according to the present invention.

Referring to FIG. 2, the present invention provides an LED backlight driving circuit, which comprises an isolation MOS transistor Q1, a dimming MOS transistor Q2 connected in parallel to the isolation MOS transistor Q1, a first resistor R1, and a second resistor R2. The first resistor R1 and the second resistor R2 are connected to each other in parallel and are connected between the dimming MOS transistor Q2 and a ground wire. The isolation MOS transistor Q1 and the dimming MOS transistor Q2 are arranged for electrical connection with an LED light. This ensures that when shorting occurs between positive and negative terminals of the LED light, a relatively large voltage difference is applied to a first source terminal S of the isolation MOS transistor Q1 in order to protect integrated circuit (IC) of an electronic device and the current flowing through the isolation MOS transistor Q1 is made small or even approximately null so as to reduce the amount of heat emitting from the isolation MOS transistor Q1 and thus lower the temperature thereof.

The isolation MOS transistor Q1 comprises the first source terminal S, a first drain terminal D, and a first gate terminal G. The dimming MOS transistor Q2 comprises a second source terminal S, a second drain terminal D, and a second gate terminal G. The first source terminal S is connected to the second source terminal S for connection with the LED light. The first gate terminal G is electrically connected to a power output terminal 20 of the LED backlight driving circuit. The second gate terminal G is electrically connected to the dimming module 40. The second drain terminal D is connected to an end of the first and second resistors R1, R2. The first and second resistors R1, R2 have an opposite end that is electrically connected to the ground wire. The electrical current that flows through the LED light goes on to flow through the dimming MOS transistor Q2 and the first and second resistors R1, R2 toward the ground wire, lessening the electrical current flowing through the isolation MOS transistor Q1.

The LED backlight driving circuit further comprises a signal amplification module electrically connected to the first drain terminal D of the isolation MOS transistor Q1. The signal amplification module is a signal amplifier, which comprises a first pin 1, a second pin 2, a third pin 3, a fourth pin 4, and a fifth pin 5. The first pin 1 is electrically connected to the first drain terminal D of the isolation MOS transistor Q1. The second to fifth pins 2, 3, 4, 5 are provided for connection with a driving power source and transmission of signals.

The LED backlight driving circuit further comprises a constant current source 60. The constant current source 60 is electrically connected to the second drain terminal D to set the second drain terminal D in an electrically biased condition. The constant current source 60 is generated with power supply of the LED backlight driving circuit.

Referring to FIGS. 2 and 3, the present invention also provides an LED backlight driving method, which comprises the following steps:

Step 1: providing an isolation MOS transistor Q1, a dimming MOS transistor Q2, a first resistor R1, a second resistor R2, and a signal amplification module.

The isolation MOS transistor Q1 comprises a first source terminal S, a first drain terminal D, and a first gate terminal G. The dimming MOS transistor Q2 comprises a second source terminal S, a second drain terminal D, and a second gate terminal G. The signal amplification module is a signal amplifier, which comprises a first pin 1, a second pin 2, a third pin 3, a fourth pin 4, and a fifth pin 5.

Step 2: connecting the isolation MOS transistor Q1 and the dimming MOS transistor Q2 to each other in parallel and electrically connecting the dimming MOS transistor Q2 via the first and second resistors R1, R2 to a ground wire, wherein a common node of the isolation MOS transistor Q1 and the dimming MOS transistor Q2 is connected to an LED light.

The first source terminal S is connected to the second source terminal S for connection with the LED light. The first gate terminal G is electrically connected to a power output terminal 20 of the LED backlight driving circuit. The second gate terminal G is electrically connected to the dimming module 40. The second drain terminal D is connected to an end of the first and second resistors R1, R2. The first and second resistors R1, R2 have an opposite end that is electrically connected to a ground wire. The electrical current that flows through the LED light goes on to flow through the dimming MOS transistor Q2 and the first and second resistors R1, R2 toward the ground wire, lessening the electrical current flowing through the isolation MOS transistor Q1.

Connecting the isolation MOS transistor Q1 and the dimming MOS transistor Q2 in parallel ensures that when shorting occurs between positive and negative terminals of the LED light, a relatively large voltage difference is applied to a first source terminal S of the isolation MOS transistor Q2 in order to protect integrated circuit (IC) of an electronic device and the current flowing through the isolation MOS transistor Q1 is made small or even approximately null so as to reduce the amount of heat emitting from the isolation MOS transistor Q1 and thus lower the temperature thereof.

Step 3: connecting the isolation MOS transistor Q1 to the signal amplification module.

The first pin 1 of the signal amplifier is electrically connected to the first drain terminal D of the isolation MOS transistor Q1. The second to fifth pins 2, 3, 4, 5 are provided for connection with a driving power source and transmission of signals.

Step 4: providing a constant current source 60 and electrically connecting the constant current source 60 to the dimming MOS transistor Q2.

Electrically connecting the constant current source 60 to the dimming MOS transistor Q2 is to electrically connect the constant current source 60 to the second drain terminal D so as to set the second drain terminal D in an electrically biased condition. The constant current source 60 is generated with power supply of the LED backlight driving circuit.

In summary, the present invention provides an LED backlight driving circuit, which comprises an isolation MOS transistor and a dimming MOS transistor connected to each other in parallel so as to make the electrical current flowing through the isolation MOS transistor lessened to reduce the amount of heat emitting therefrom and enhance operation safety and also allow the MOS transistor used to be of a downgraded specification to lower down the manufacture cost. The LED backlight driving method according to the present invention lessens the electrical current of the isolation MOS transistor so as to reduce the amount of heat emitting therefrom, enhance operation safety, allow the MOS transistor used to be of a downgraded specification, and thus lower down manufacture cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An LED (light-emitting diode) backlight driving circuit, comprising an isolation MOS transistor, a dimming MOS transistor connected in parallel to the isolation MOS transistor, a first resistor, and a second resistor, the first resistor and the second resistor being connected to each other in parallel and being connected between the dimming MOS transistor and a ground wire, the isolation MOS transistor and the dimming MOS transistor being arranged for electrical connection with an LED light.

2. The LED backlight driving circuit as claimed in claim 1, wherein the isolation MOS transistor comprises a first source terminal, a first drain terminal, and a first gate terminal and the dimming MOS transistor comprises a second source terminal, a second drain terminal, and a second gate terminal, the first source terminal being connected to the second source terminal for connection with the LED light, the first gate terminal being electrically connected to a power output terminal of the LED backlight driving circuit, the second gate terminal being electrically connected to the dimming module, the second drain terminal being connected to an end of the first and second resistors.

3. The LED backlight driving circuit as claimed in claim 2, wherein the first and second resistors have an opposite end that is electrically connected to the ground wire.

4. The LED backlight driving circuit as claimed in claim 2 further comprising a signal amplification module electrically connected to the first drain terminal of the isolation MOS transistor.

5. The LED backlight driving circuit as claimed in claim 4, wherein the signal amplification module is a signal amplifier, which comprises a first pin, a second pin, a third pin, a fourth pin, and a fifth pin, the first pin being electrically connected to the first drain terminal of the isolation MOS transistor.

6. The LED backlight driving circuit as claimed in claim 2 further comprising a constant current source, the constant current source being electrically connected to the second drain terminal.

7. An LED (light-emitting diode) backlight driving circuit, comprising an isolation MOS transistor, a dimming MOS transistor connected in parallel to the isolation MOS transistor, a first resistor, and a second resistor, the first resistor and the second resistor being connected to each other in parallel and being connected between the dimming MOS transistor and a ground wire, the isolation MOS transistor and the dimming MOS transistor being arranged for electrical connection with an LED light;

wherein the isolation MOS transistor comprises a first source terminal, a first drain terminal, and a first gate terminal and the dimming MOS transistor comprises a second source terminal, a second drain terminal, and a second gate terminal, the first source terminal being connected to the second source terminal for connection with the LED light, the first gate terminal being electrically connected to a power output terminal of the LED backlight driving circuit, the second gate terminal being electrically connected to the dimming module, the second drain terminal being connected to an end of the first and second resistors;

wherein the first and second resistors have an opposite end that is electrically connected to the ground wire;

further comprising a signal amplification module electrically connected to the first drain terminal of the isolation MOS transistor;
wherein the signal amplification module is a signal amplifier, which comprises a first pin, a second pin, a third pin, a fourth pin, and a fifth pin, the first pin being electrically connected to the first drain terminal of the isolation MOS transistor; and
further comprising a constant current source, the constant current source being electrically connected to the second drain terminal.

8. An LED (light-emitting diode) backlight driving method, comprising the following steps:
(1) providing an isolation MOS transistor, a dimming MOS transistor, a first resistor, a second resistor, and a signal amplification module;
(2) connecting the isolation MOS transistor and the dimming MOS transistor to each other in parallel and electrically connecting the dimming MOS transistor via the first and second resistors to a ground wire, wherein a common node of the isolation MOS transistor and the dimming MOS transistor is connected to an LED light; and
(3) connecting the isolation MOS transistor to the signal amplification module.

9. The LED backlight driving method as claimed in claim 8, wherein the isolation MOS transistor comprises a first source terminal, a first drain terminal, and a first gate terminal and the dimming MOS transistor comprises a second source terminal, a second drain terminal, and a second gate terminal, the first source terminal being connected to the second source terminal for connection with the LED light, the first gate terminal being electrically connected to a power output terminal of the LED backlight driving circuit, the second gate terminal being electrically connected to the dimming module, the second drain terminal being connected to an end of the first and second resistors, the first and second resistors having an opposite end that is electrically connected to the ground wire.

10. The LED backlight driving method as claimed in claim 9 further comprising step (4) of providing a constant current source and electrically connecting the constant current source to the dimming MOS transistor.

11. The LED backlight driving method as claimed in claim 9, wherein the signal amplification module is a signal amplifier, which comprises a first pin, a second pin, a third pin, a fourth pin, and a fifth pin, and step (3) electrically connecting the first pin of the signal amplifier to the first drain terminal of the isolation MOS transistor.

* * * * *